United States Patent [19]
Furia

[11] 3,772,698
[45] Nov. 13, 1973

[54] APPARATUS FOR TESTING THE ROAD-TIRE ADHESION OF A VEHICLE

[75] Inventor: André Furia, Neuilly, France

[73] Assignee: Societe Anonyme D.B.A., Paris, France

[22] Filed: May 17, 1971

[21] Appl. No.: 144,146

[30] Foreign Application Priority Data
May 20, 1970 France.............................. 7018318

[52] U.S. Cl................ 343/13 R, 73/146, 303/21 R
[51] Int. Cl............................. G01s 9/06, B60t 8/06
[58] Field of Search..................... 303/21 AF, 21 P; 73/146, 9; 343/7 ED, 13 R; 235/151.32, 150.24; 180/82

[56] References Cited
UNITED STATES PATENTS

| | | | |
|---|---|---|---|
| 3,659,263 | 4/1972 | Gunsser et al.................. | 303/21 CF |
| 3,697,139 | 10/1972 | Elliott et al........................ | 303/21 P |
| 3,650,574 | 3/1972 | Okamoto........................ | 303/21 AF |
| 3,442,347 | 5/1969 | Hodgson et al. ................. | 343/7 ED |
| 3,612,620 | 10/1971 | Riordan............................ | 303/21 P |
| 3,614,173 | 10/1971 | Branson............................ | 303/21 P |
| 3,554,024 | 1/1971 | Walker ............................. | 73/146 |
| 3,431,776 | 3/1969 | Hughes............................. | 73/146 |

OTHER PUBLICATIONS
Skolnik, M. I., "Introduction to Radar Systems," McGraw-Hill, 1962, pp. 555, 556.

Millman & Taub, "Pulse, Digital, and Switching Waveforms," McGraw-Hill, 1965, pp. 27–35, pp. 38–40.

*Primary Examiner*—Benjamin A. Borchelt
*Assistant Examiner*—G. E. Montone
*Attorney*—W. N. Antonis and Plante, Hartz, Smith and Thompson

[57] ABSTRACT

The apparatus gives information relative to the road-tyre adhesion of a vehicle, comprising an electronic anti-skid device so as to allow the driver to appraise or to know the distance over which move during a panic braking before coming to a stop or before slowing down to a safe speed. The apparatus comprises a pulse-width measuring circuit for measuring the duration of the isolation signals which are developed in the anti-skid device for temporarily isolating the braking system. The information can be displayed by colored lamps. However, the apparatus can comprise more elaborate indicating means delivering signals which can be converted into direct readings or into signals representative of the theoretical braking distance. The comparison of these signals with signals delivered by a range finding device measuring the distance separating the vehicle from an obstacle ahead allows a warning signal to be obtained when the distance is unsafe.

6 Claims, 2 Drawing Figures

APPARATUS FOR TESTING THE ROAD-TIRE ADHESION OF A VEHICLE

This invention relates to an apparatus for testing the road-tire adhesion or gripping ability of a vehicle having a braking system equipped with an electronic anti-skid device.

An anti-skid device substantially reduces the braking distances and improves the directional stability during braking. However, it may be feared that some drivers will gain an excessive confidence from the feeling of safety given by the anti-skid device, so as to wrongfully believe that they are able to stop very quickly at any moment, whereas in fact the braking distance varies as a function of the adhesion between the road and the tires of the vehicle.

It is known that, in the course of a braking operation, an anti-skid device develops isolation signals for creating recurrent periods during which the braking system is isolated. It has been remarked that the isolation signals have a duration which is a function of the road-tire adhesion.

Taking advantage of this remark, it is an object of the invention to provide an apparatus for supplying a driver with information relative to the road-tire adhesion, allowing him to estimate or to know the distance over which his vehicle will move during a panic braking before coming to a complete stop or before reaching a reduced speed compatible with security.

According to the invention, the isolation signals are applied to the input of a pulse-width measuring circuit, the output of this circuit being connected to indicating means. In a preferred embodiment, the pulse-width measuring circuit comprises a derivating circuit producing a first pulse in response to the leading edge of each isolation signal and a second pulse in response to the trailing edge of the signal, a monostable circuit triggered by the first pulse, and at least one two-input AND gate, the second pulse being applied to one input of the gate, while the output of the monostable circuit is connected to the other input of the gate, and the output of the gate constitutes the output of the pulse-width measuring circuit.

When the indicating means comprises a few visible or audible indicators, for example green, yellow, and red lamps indicating a good, medium or bad road-tire adhesion, the succint information displayed is sufficient for rousing the driver's attention.

It will be noted that the information depends not only upon the road condition, but also upon the degree of wear of the tires. For example, if the red lamp is displayed when the road is hardly wet, the driver will know that the tires need replacing.

However, with more elaborate indicating means, a substantially accurate value of the coefficient of adhesion can be obtained. This information, combined with an information relative to the vehicle speed, can be supplied to a computer circuit conceived for issuing an information relative to the braking distance.

The invention will now be described by way of example with reference to the accompanying drawings in which.

Figure 1:
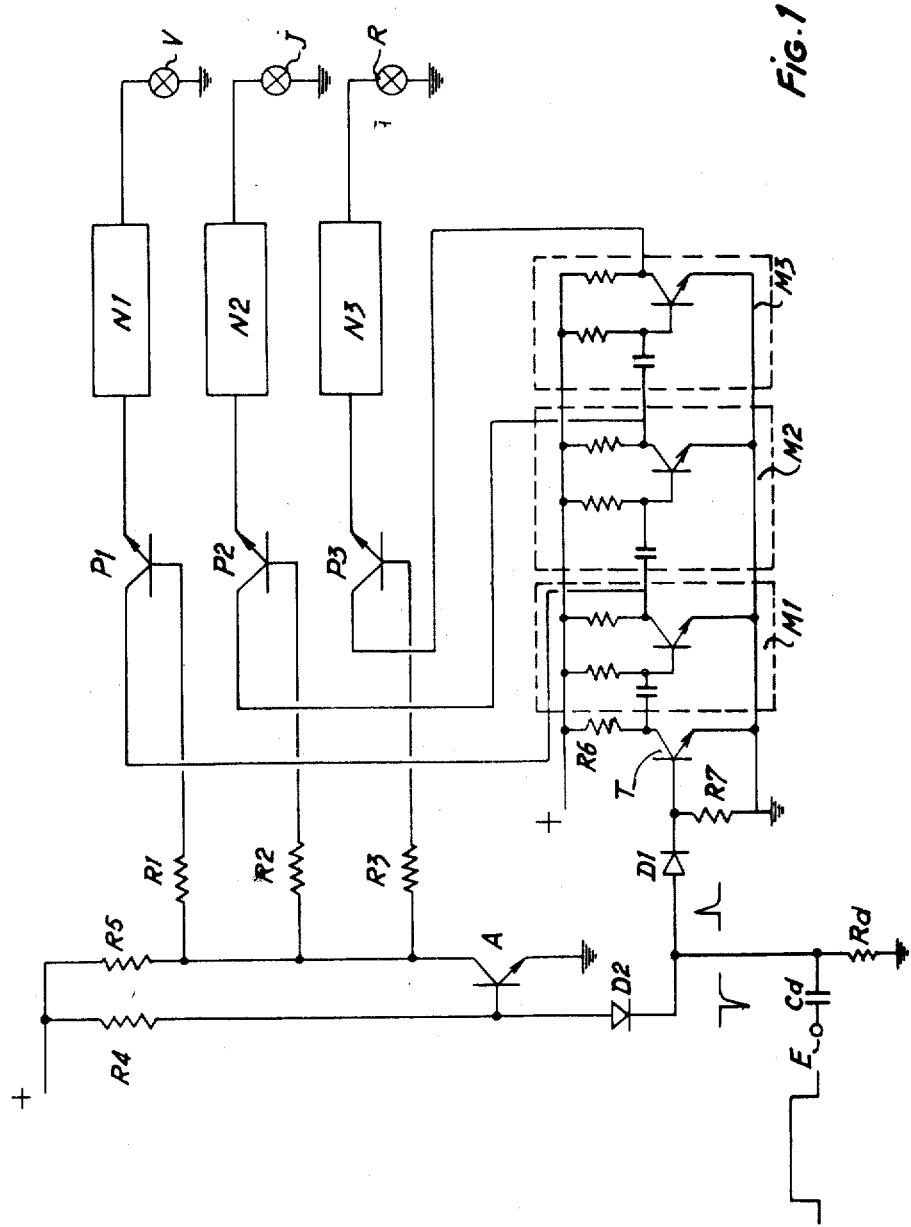
FIG. 1 is the diagram of an apparatus according to the invention

Referring to FIG. 1, the apparatus for testing the gripping aptitude of a vehicle comprises a multi-stage monostable circuit having three stages M1, M2, M3, an amplifier A and three AND gates P1, P2, P3. Each of the AND gates receives a signal from the amplifier and from one of the monostable stages, and delivers a signal to an indicating device V, J or R through a timing device N1, N2, or N3.

The monostable circuit is of a conventional type. Each stage of the circuit comprises a NPN transistor having an emitter electrode connected to ground, the base and collector electrodes being connected to the positive terminal + of a voltage source through respective resistors. A condenser is connected between the collector of the transistor in one of the stages and the base of the transistor in the next stage. When a pulse is applied on the condenser connected to the base of the transistor in the first stage M1, the collector of this transistor delivers an output signal having a duration which is a function of the discharging time of the condenser. The end of this signal initiates a signal in the next stage, and so on. The signals in the various stages may have equal or different durations.

Each of the AND gates P1,P2,P3, may be constituted by a transistor having a base electrode connected to the output of the amplifier A through respective resistors R1,R2,R3, and a collector electrode connected to the output of one stage in the monostable circuit. The emitter electrodes of these transistors are connected to the input terminals of the timing devices N1, N2, N3, respectively.

The amplifier A is constituted by a transistor of the NPNtype having an emitter electrode connected to ground, and having base and collector electrodes connected to the positive terminal + of the voltage source through resistors R4, R5, respectively.

The timing devices N1,N2,N3, may be constituted by conventional trigger circuit and, for simplification purposes, they are shown as plain squares. These timing devices serve to extend the duration of the output signals delivered by the AND gates. They are necessary only when the indicating devices have a relatively slow response, or when the signals feeding the indicating devices must have a longer duration than the output signals of the AND gates, which occurs for example when lamps are used as indicating devices.

The apparatus further comprises a differentiating circuit in which a condenser Cd and a series resistor Rd are connected between an input terminal E and ground. The common point of the condenser Cd and the resistor Rd is simultaneously connected to the cathode electrode of a diode D1 and to the anode electrode of a diode D2, the cathode of diode D2 being connected to the control electrode of amplifier A, while the anode of diode D1 is connected to the input of a pulse-shaping stage comprising a transistor T and resistors R6, R7, the collector of transistor T being connected to the condenser in the first stage M1 of the monostable circuit. The direction in which the diodes D1 and D2 are connected is such that diode D1 is conducting when the derivating circuit issues a positive signal and the diode D2 is conducting when the derivating circuit issues a negative signal.

The input terminal E is adapted to receive isolation signals which are developed a number of times during a brake application for momentarily isolating the braking system of a vehicle equipped with an anti-skid device.

In the operation, responsive to the leading edge of the isolation signal, the differentiating circuit Cd–Rd issues a positive pulse which, through the diode D1 and through the pulse-shaping transistor T, triggers the first stage M1 in the monostable circuit. Responsive to the trailing edge of the isolation signal, the derivating circuit Rd–Cd issues a negative pulse which is applied to the input of the amplifier A through the diode D2 and gives rise to an amplified output signal which is transmitted to the base electrodes of the transistors P1,P2,P3.

If the trailing edge of the isolation signal appears while the first stage M1 of the monostable circuit is delivering an output signal, the transistor P1 will shift to the conducting state, thus delivering an actuating signal to the timing N1, hence to the indicating device V. In this case, the isolation signal has a short duration, and it indicates that the vehicle adhesion is good.

However, if the isolation signal extends intime beyond the relaxation time of the first stage M1, the output signal of the stage M1 will vanish and be replaced by the output signal of the stage M2 and possibly this latter signal will be replaced by the output signal of the stage M3. If the isolation signal ends prior to the relaxation of the stage M2, the transistor P2 will shift to the conducting state, thus energizing the indicating device J to indicate a medium adhesion of the vehicle. If the isolation signal ends after the relaxation of the stage M2, the transistor P3 will become conducting to energize the indicating device R and display the information that the vehicle adhesion is bad.

When the indicating devices are few in number, for example three in number as in FIG. 1, they may be constituted by colored lamps. One or the other of the lamps is switched on every time the driver depresses the brake pedal. At any moment, the driver may apply the brakes briefly for testing the vehicle adhesion.

However, the number of indicating devices may be as great as desired, it being sufficient that the AND gates and the monostable stages are provided in equal number. The indicating devices can be so devised as to deliver coded signals or stepped voltages from which fairly accurate values of the vehicle gripping factor can be obtained either in the form of electrical signals or in the form of direct readings.

Figure 2:
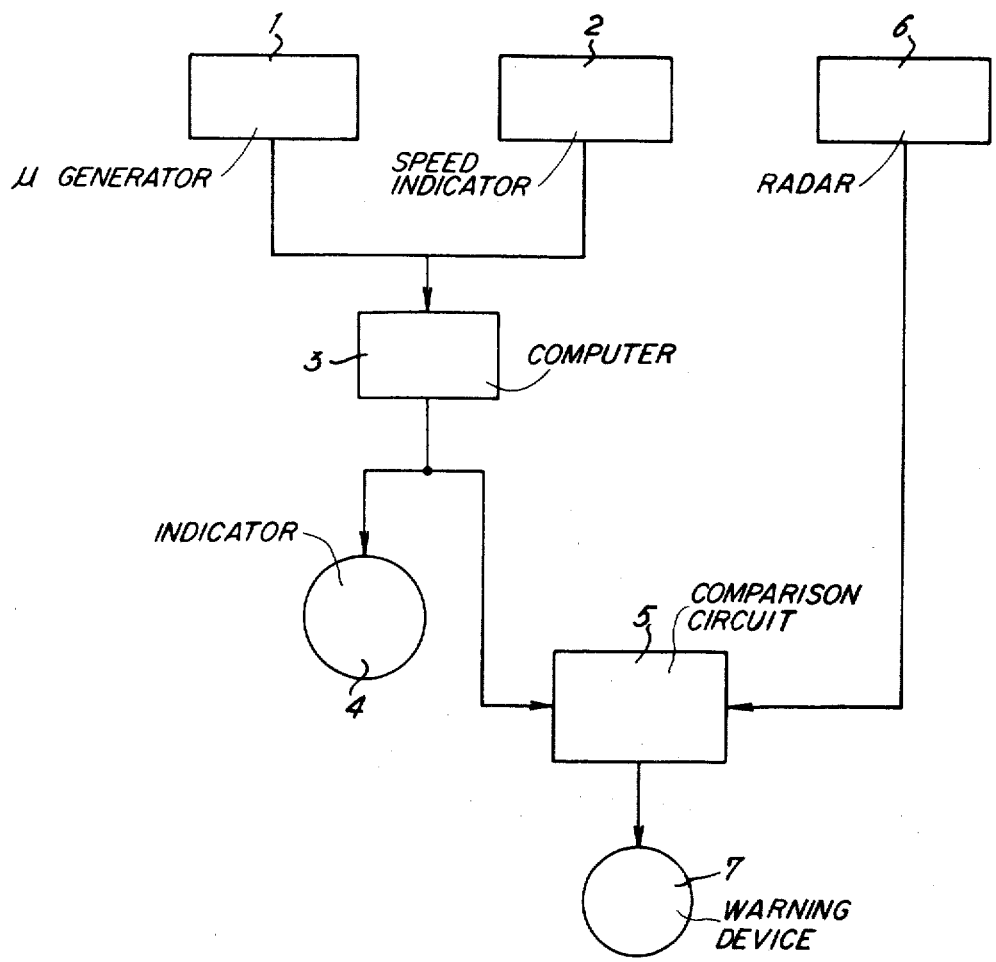
FIG. 2 is the block-diagram of a warning system incorporating the apparatus according to the invention.

FIG. 2 is the block-diagram of a system in which the apparatus of the invention, 1, giving values of the gripping factor $\mu$ of a vehicle, is used for finding the theoretical braking distance F1, and for comparing this distance F1 to the actual distance F2 separating the vehicle from an obstacle such as a vehicle ahead.

The braking distance is obtained from the equation:

$$F1 = V^2/2\ \mu g$$

in which $V$ is the vehicle speed and $g$ the acceleration of gravity.

In the system illustrated in FIG. 2, the output signals of the apparatus 1 and the output signals of a speed indicator 2 are processed in a computer 3 which feeds an indicator 4 with signals proportional to $V^2/2\ \mu g$, hence proportional to the theoretical distance F1. A comparison circuit 5 simultaneously receives these signals and signals delivered by an acoustical or electromagnetical range finding apparatus such as a radar 6, used for measuring the actual distance F2. The output terminal of the comparison circuit is connected to a warning device 7. The warning device is energized by the output signals of the comparison circuit when the theoretical braking distance F1 is greater than the actual distance F2.

A brief application of the brakes allows the driver to read the theoretical braking distance F1 on the indicator 4. Moreover, the warning device 7 issues a visible or audible signal when the vehicle ahead is insufficiently distant for avoiding a collision if this vehicle stops abruptly.

In the system just described, it is assumed that the vehicle ahead can stop instantaneously. In fact, this vehicle will move over a certain distance before coming to a complete stop. This might be taken into account, but caution recommends not to do so, because account must also be taken of the time which elapses from the moment when the driver ahead initiates a braking operation to the moment when the following driver is aware of this fact.

What is claimed is:

1. In a wheeled vehicle having an antiskid system responsive to the rotational speed of a vehicle wheel for generating an isolating signal controlling the brake associated with said wheel, apparatus for testing the road-tire adhesion of the vehicle comprising:
    means for differentiating said isolating signal to produce a first pulse in response to the leading edge of said isolating signal and a second pulse in response to the trailing edge of said isolating signal;
    monostable circuit means triggered by said first pulse to produce an output signal;
    gating means producing an output signal when both said second pulse and the output signal from said monostable circuit means are transmitted to said gating means, whereby the output signal of said gating means indicates that the time lapse between the first and second pulses is less than the relaxation time of the monostable circuit means; and
    indicating means responsive to the output signal of said gating means.

2. The invention of claim 1:
    there being a plurality of said gating means and a corresponding monostable circuit means connected in cascade for each of said gating means, the output of each of said monostable gating means being connected to an input of a corresponding gating means, and means transmitting said second pulse to another input of each of said gating means simultaneously.

3. The invention of claim 1; and
    a timing device connected between the indicating means and the output of said gating means.

4. The invention of claim 3:
    said indicating means including at least one lamp.

5. The invention of claim 1:
    means for generating a speed signal proportional to the velocity of said vehicle wheel; and
    means responsive to said speed signal and to the output signal of said gating means for generating a signal proportional to the theoretical distance required to stop the vehicle.

6. The invention of claim 5:
    range finding means for generating a signal proportional to the distance between said vehicle and an obstacle ahead of said vehicle; and comparator means for comparing said signal proportional to the distance between the vehicle and an obstacle ahead of said vehicle with said signal representing the theoretical distance required to stop the vehicle and actuating a warning device whenever the theoretical distance to stop the vehicle is greater than the distance between the vehicle and an obstacle ahead of said vehicle.

* * * * *